United States Patent [19]

Ando

[11] 4,111,500
[45] Sep. 5, 1978

[54] SEALING STRUCTURE FOR A BEARING

[75] Inventor: Shigenori Ando, Narashino, Japan

[73] Assignee: Seiko Seiki Kabushiki Kaisha, Japan

[21] Appl. No.: 782,966

[22] Filed: Mar. 30, 1977

[30] Foreign Application Priority Data

Mar. 31, 1976 [JP] Japan .................................. 51-35580

[51] Int. Cl.² ............................................. F16C 33/74
[52] U.S. Cl. .................................. 308/187; 277/135;
308/36.3
[58] Field of Search .................... 308/187, 187.1, 36.3,
308/93, 98, 121, 122, 123; 277/72 FM, 135;
184/6.26

[56] References Cited
U.S. PATENT DOCUMENTS

| 2,448,717 | 9/1948 | Jeffcock | 277/135 |
| 2,697,645 | 12/1954 | Mitchell | 308/187 |

FOREIGN PATENT DOCUMENTS 815,884   7/1959   United Kingdom ..................... 277/135

Primary Examiner—Trygve M. Blix
Assistant Examiner—Charles E. Frankfort
Attorney, Agent, or Firm—Robert E. Burns; Emmanuel J. Lobato; Bruce L. Adams

[57] ABSTRACT

A sealing structure for protecting the bearing of a high speed spindle such as a grinding wheel spindle comprises a bearing cover having an opening that receives and closely surrounds the spindle adjacent the bearing. Three annular recesses provided in the opening of the bearing cover open inwardly to the spindle. An annular channel in the bearing cover radially outwardly of the opening is supplied with pressurized lubricating fluid and is connected by angularly spaced passages with the first and third of the annular recesses so as to supply the pressurized lubricating fluid to them, while the second of the recesses located between the other two is provided with exhaust passages so as to carry off the pressurized lubricating fluid together with any chips or other impurities entering between the spindle and the opening in the bearing cover. The annular channel in the bearing cover is also connected with the bearing so as to supply the pressurized lubricating fluid to the bearing.

4 Claims, 4 Drawing Figures

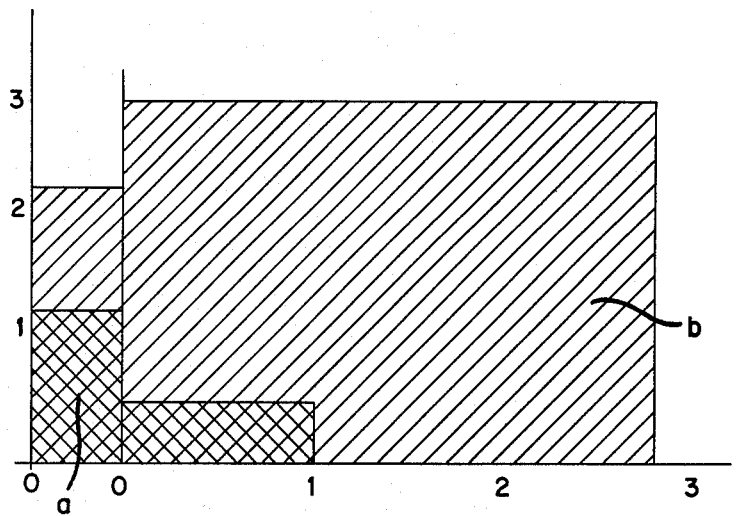
FIG. 3
FIG. 4
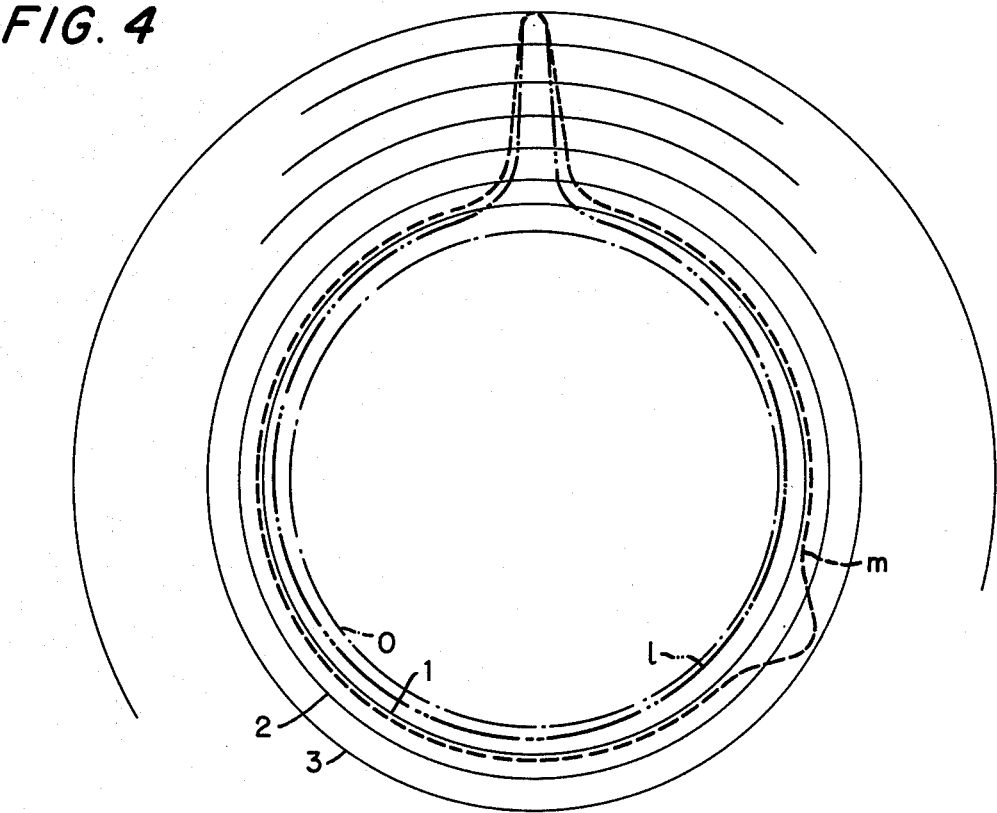

SEALING STRUCTURE FOR A BEARING

BACKGROUND OF THE INVENTION

This invention relates to a sealing structure for a bearing.

For lubricating bearings in high speed spindles such as a grinding wheel spindle, oil-fog lubrication is generally used, in which oil mist is poured from the outside toward bearings. This lubrication has remarkable lubricating and cooling effect in comparison with other lubricating methods, and further is said to have some sealing effect because oil mist spouts out, through the gap between the journal of the spindle and the opening surrounding the journal.

But the oil mist amount spouting out through the gap is practically not enough for sufficient sealing, particularly in case of an internal grinder which uses high pressure coolant pouring into the working area. Pressured coolant is apt to penetrate into the bearings, overcoming oil mist. The penetration of coolant remarkably shortens the bearing life.

Further, recent centerless workpiece holders for internal grinders use hydrostatic pressure. This pressure causes pressurized liquid for work holding to penetrate into the bearings because the liquid pours directly toward the spindle nose.

For solving the above problem, the application of sealing means of mechanical seal, oil seal or the like is not preferable on account that perfect and reliable sealing and its maintenance could not be expected in such high pressure fluid atmosphere as described above.

SUMMARY OF THE INVENTION

This invention is intended to overcome the above defects, providing a sealing structure for a bearing in which an opening penetrated through by a spindle is provided with a plurality of pressurized fluid outlet holes and exhaust holes, pressurized fluid pouring out of the outlet holes into the gap between the spindle and the opening to thereby exhaust impurities such as coolant and chips with pressurized fluid.

BRIEF DESCRIPTION OF THE DRAWINGS

FIG. 3 represents sealing area of devices of the prior art and of this invention, and FIG. 4 represents the manner in which pressure distribution in a recess is changed on account of the nozzle number.

DESCRIPTION OF THE PREFERRED EMBODIMENT

An embodiment sealing structure, according to this invention applied to a grinding wheel spindle having a high-frequency motor built therein will now be described herein with reference to the drawings.

Figure 1:
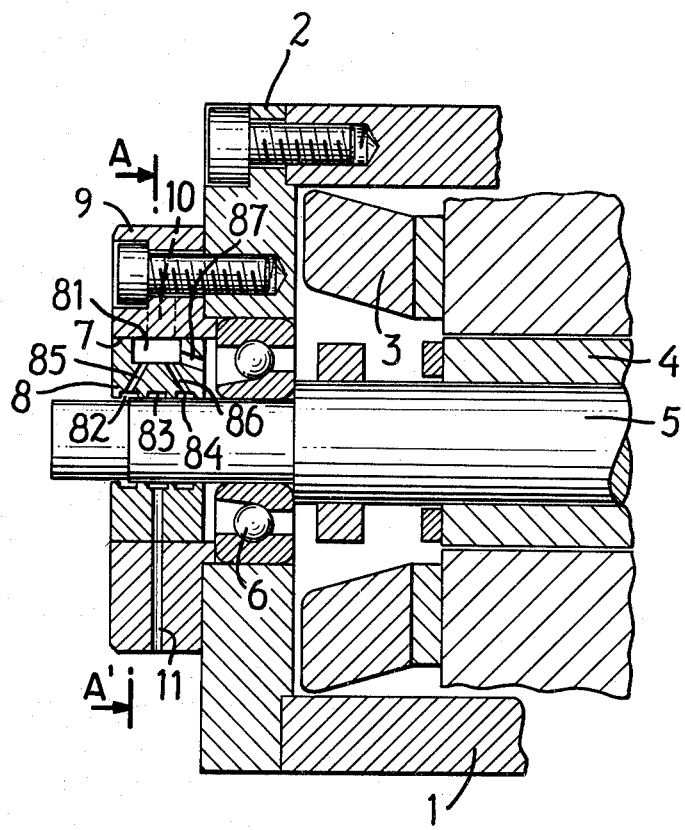
FIG. 1 is a longitudinal sectional view showing a grinding wheel spindle having a high frequency motor built therein and a sealing structure according to the invention.
Figure 2:
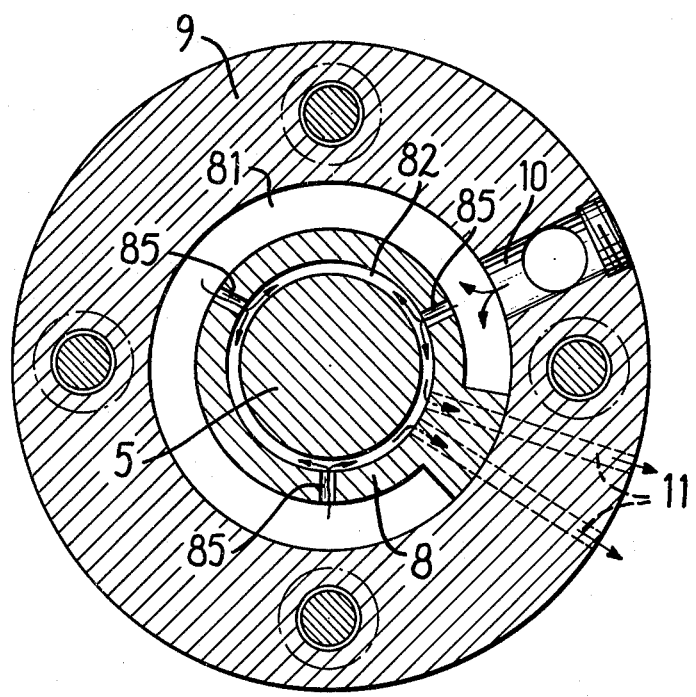
FIG. 2 is a sectional view taken on line A-A' in FIG. 1.

FIG. 1 is a partial longitudinal sectional view showing a grinding wheel spindle having a sealing structure according to the invention, and FIG. 2 is a sectional view taken on line A-A' of FIG. 1.

1 designates a cylindrical spindle housing, 2 designates a front plate fixed to the front end of housing 1, 3 designates a motor stator mounted within the forward portion of housing 1, and 4 designates a motor rotor fixed coaxial within stator 3 to a grinding wheel spindle 5.

Spindle 5 is supported rotatable by a ball bearing 6 at the front portion, such ball bearing being mounted on front plate 2, and projects out through the bore of bearing 6 and a bushing 8 fixed in an opening 7 of a bearing cover 9 mounted on the front plate 2 for holding a grinding wheel (not shown in the drawings) at the nose thereof.

An oil mist supplying path 10 is formed in the bearing cover 9. An outer annular groove 81 of bushing 8 communicates with the oil mist supplying path 10 and further with nozzles 85 and 86 which open to two inner annular recesses 82 and 84 of bushing 8, each three of said nozzles being placed at equal distances on a circle for recess 82 or 84 respectively. Between annular recesses 82 and 84, a further annular recess 83 is formed as will be described later.

A nozzle 87 is formed at the inner side of groove 81 in bushing 8 for pouring oil mist toward the movable members of the bearing 6.

Annular recess 83 communicates with exhaust holes 11 which serve to flow out impurities with the oil mist.

In the above spindle device, the high frequency motor consisting of stator 3 and rotor 4 drives spindle 5 at a high speed, oil mist from path 10 pouring toward bearing 6 through nozzle 87 and toward annular recesses 82 and 84 through nozzles 85 and 86. Pressurized oil mist fills annular recesses 82 and 84 and further 83, flowing out by way of the front gap between the journal of spindle 5 and the opening of bushing 8 and by way of exhaust pipes 11 forcibly. (The oil mist flow from path 10 to exhaust holes 11 is well illustrated with arrows in FIG. 2).

Therefore, chips, high pressure fluid and coolant cannot penetrate into the housing, but are exhausted through exhaust holes 11, even if they flow directly toward front plate 2, as recesses 82, 83 and 84 obstruct them. Ball bearing 6 is fully protected from impurities etc.

An experiment is done for confirming the effect of the invention. The result is as follows.

FIG. 3 shows a simplified representation of the sealing effect for bearings, the horizontal axis indicating the speed of coolant poured toward the bearing and the vertical axis indicating the coolant pressure.

In area $a$ in FIG. 3, a conventional sealing device having a recess for supplying pressurized air acts provides perfect sealing. In area $a+b$, the sealing structure shown in FIGS. 1 and 2 according to this invention acts the same.

As shown in FIG. 3, it is clearly understood that the present invention provides a sealing structure having far higher sealing capacity than those of the prior art.

FIG. 4 shows a pressure distribution pattern observed in an experiment in the annular recess when pressurized oil mist is supplied to it, curve 1 being formed in case of a single supplying nozzle while curve m being formed when three nozzles are used for a recess.

As clearly shown in these distrubution curves, a greater number of nozzles proved to make the recess higher and more uniformed pressurized so that better obstruction of impurities is obtained. (0, 1, 2 and 3 in FIG. 4 designate the nozzle number).

As described above, the sealing structure according to the invention comprises a plurality of annular recesses for supplying pressurized fluid and those for exhausting fluid in the opening through which the journal of the spindle is placed, pouring pressurized fluid into the gap between the opening and the journal to thereby eject impurities such as chip or coolant through the exhaust recess. Therefore, longer bearing life and simple maintenance of the bearing can be obtained with this invention.

What is claimed is:

1. A sealing structure for protecting a bearing for a journal of a spindle, comprising a bearing cover having an opening that receives and closely surrounds said journal adjacent said bearing, a plurality of annular recesses in said opening, said recesses surrounding said journal and opening inwardly to said journal, an annular channel in said bearing cover radially outwardly of said opening, means for supplying pressurized lubricating fluid to said channel, first passage means from said channel to said bearing to supply said pressurized lubricating fluid to said bearing, second passage means connecting said channel to at least one of said recesses, and an exhaust opening for exhausting said pressurized lubricating fluid from at least one other of said recesses to thereby carry off any impurities entering between said journal and said opening.

2. A sealing structure according to claim 1, in which there are three of said recesses and in which said second passage means connects said channel with the first and third of said recesses and said exhaust opening exhausts said pressurized lubricating fluid from the second of said recesses disposed between said first and third recesses.

3. A sealing structure according to claim 1, in which said second passage means comprises a plurality of angularly spaced passages connecting said channel with said at least one recess.

4. A sealing structure according to claim 1, in which said bearing cover has an inner radial surface facing said bearing, and in which said first passage means comprises at least one passage extending from said annular channel to said inner radial surface.

* * * * *